United States Patent [19]

Roberson

[11] Patent Number: 6,016,496

[45] Date of Patent: Jan. 18, 2000

[54] METHOD AND APPARATUS FOR AN OBJECT-ORIENTED OBJECT FOR RETRIEVING INFORMATION FROM LOCAL AND REMOTE DATABASES

[75] Inventor: Kenneth Wayne Roberson, North Richland Hills, Tex.

[73] Assignee: International Business Machines Corporation, Armonk, N.Y.

[21] Appl. No.: 08/974,837

[22] Filed: Nov. 20, 1997

[51] Int. Cl.[7] .............................................. G06F 15/163
[52] U.S. Cl. .......................... 707/103; 707/10; 707/102; 395/200.33; 395/200.49; 395/200.58; 395/683
[58] Field of Search ........................... 707/10, 102, 103; 395/200.31, 200.47, 200.53, 200.33, 200.49, 200.58, 683

[56] References Cited

U.S. PATENT DOCUMENTS

| | | | |
|---|---|---|---|
| 5,295,265 | 3/1994 | Ducateau | 395/650 |
| 5,307,490 | 4/1994 | Davidson et al. | 709/304 |
| 5,630,042 | 5/1997 | McIntosh et al. | 395/340 |
| 5,687,373 | 11/1997 | Holmes et al. | 709/302 |
| 5,696,901 | 12/1997 | Konrad | 709/203 |
| 5,724,406 | 3/1998 | Juster | 379/67 |
| 5,761,663 | 6/1998 | Lagarde et al. | 707/10 |
| 5,764,915 | 6/1998 | Heimsoth et al. | 395/200.57 |
| 5,764,977 | 6/1998 | Oulid-Aissa et al. | 707/10 |
| 5,768,510 | 6/1998 | Gish | 395/200.33 |
| 5,828,843 | 10/1998 | Grimm et al. | 709/228 |
| 5,832,226 | 11/1998 | Suzuki et al. | 395/200.53 |
| 5,857,102 | 1/1999 | McChesney et al. | 713/100 |
| 5,857,197 | 1/1999 | Mullins | 707/103 |
| 5,889,957 | 3/1999 | Ratner et al. | 709/227 |

*Primary Examiner*—Jean R. Homere
*Attorney, Agent, or Firm*—David A. Mims, Jr.

[57] ABSTRACT

A method and apparatus for creating an object-oriented object with the ability to retrieve database type information from either a local source, or a remote source across an Internet connection via TCP/IP without the knowledge of the invoking object. The object is instanced with a well defined interface containing only primitives. All messages sent to and replies from the object are broken into primitives. The object works normally for local request. However, for request to use a server, the object utilizes a private method to open a connection with the remote server and transmit relevant instance information. The server then creates the requested object locally on the server and invokes the desired method(s). Responses to the method(s) are sent back to the client's private method, which formats the data, and hands it to the calling method.

15 Claims, 9 Drawing Sheets

PRIOR ART

METHOD AND APPARATUS FOR AN OBJECT-ORIENTED OBJECT FOR RETRIEVING INFORMATION FROM LOCAL AND REMOTE DATABASES

FIELD OF THE INVENTION

The present invention relates to data processing systems, and more particularly, to an object-oriented approach for retrieving database information from a local or remote source.

BACKGROUND OF THE INVENTION

The explosion of Internet computing is promising to change the way companies are building networks. The gradual maturity of the Internet into a business medium is enticing companies to use the net as a key pipeline for their networks, creating virtual networks interlinked through cheap connections from Internet service providers. Internet connections can provide a cheap pipeline. But even more significant, the Internet allows for connectivity from disparate platforms through universal protocols. The universal protocols allow remote employees and telecommuters access to companies Intranets through local dial-up connections. The attraction of the Internet includes low-cost, infallible infrastructure and improving security. However, while security is getting better, adding the Internet to any connection adds a long delay that can make some applications almost useless. Internet service providers are increasingly focusing on performance, with some even offering performance guarantees as part of their service. The continuing improvement of the Internet attracts many users looking for the universal connectivity of the net.

The competing interest of price versus performance has also prompted the move away from mainframes to Client/Server computing. The move to Client/Server computing means businesses are ditching their mainframe computers in favor of personal computers or workstations on local networks. The "client" is an employee on the network and the "server" is the computer that runs the network. A Client/Server set-up enables users to get and analyze data quickly. In addition to putting a company's employees on a computer network, which helps them to communicate better, Client/Server computing allows users to use different hardware, software and information from different sources. Client/Server computer is moving to an open, flexible platform that allows the integration of data from different platforms and sources. While Client/Server computing sounds wonderful, there are still problems. In the classic Client/Server architecture, the client and server are two separate and distinct programs. Most of the processing work is done by the server. The client only offers a view into the server's data. Generally, set-up of these applications is often tedious and the programs rarely share code.

The release of the Java object-oriented product by Sun Microsystems, Inc., provides a windowing system, Internet protocol and platform independent product. Java satisfies the public's desire to animate and add dynamism to the static web pages of the Internet. More importantly, Java's platform independence levels the playing field for software vendors, enabling them to escape the dominance of a single supplier. Java permits writing to a virtual platform which is installed on most desktop web browsers. System managers have quickly recognized the advantage of a single master copy of programs that are stored in one place, ideal for easy update, that downloads to the client for the duration of the session, thus exploiting the users desktop processor in a client/server model but without the client side maintenance and version control costs. For details and background with respect to the Java System, reference may be made to a typical text, "Just Java", 2nd Edition, Peter van der Linden, Sun Microsystems, 1997.

Consequently, it would be desirable to provide a method and apparatus for an object-oriented object with the ability to run either connected to a server or in a stand-alone mode which minimizes the server workload to ensure quick response.

SUMMARY OF THE INVENTION

This invention relates to a method and apparatus for creating an object-oriented object with the ability to retrieve database type information from either a local source, or across an Internet connection via TCP/IP without the knowledge of the invoking object. Applications/applets containing the object need only set a static Boolean flag in the object for remote access. The object is instanced with a well defined interface containing only primitives. All messages sent to and replies from the object are broken down into primitives. The use of primitives helps in encapsulating the object and makes transmittal of needed information simple using built in Java methods. The object works normally for local request. For request to use a server, the object utilizes a private method to open a connection with the remote server and transmits relevant instance information to the remote server. The server then creates the requested object locally on the server and invokes the desired method(s). Responses to the method(s) are sent back to the client's private method, which formats the data, and hands it to the calling method.

DETAILED DESCRIPTION OF THE EMBODIMENTS

This invention provides a method and apparatus for an object-oriented object with the ability to retrieve database type information from either a local source, or across an Internet connection without the knowledge of the invoking object. The application/applet containing the object needs only to set a static boolean flag within the object for remote access. The object is instanced with a well defined interface containing only primitives (e.g., String, int, double, . . . ). All messages sent to, and replies from, the object are broken into primitives. The use of primitives help in encapsulating the object, and makes transmittal of needed information simple using built in Java methods (e.g., writeUTF, writeBoolean, readUTF, . . . ).

Figure 1:
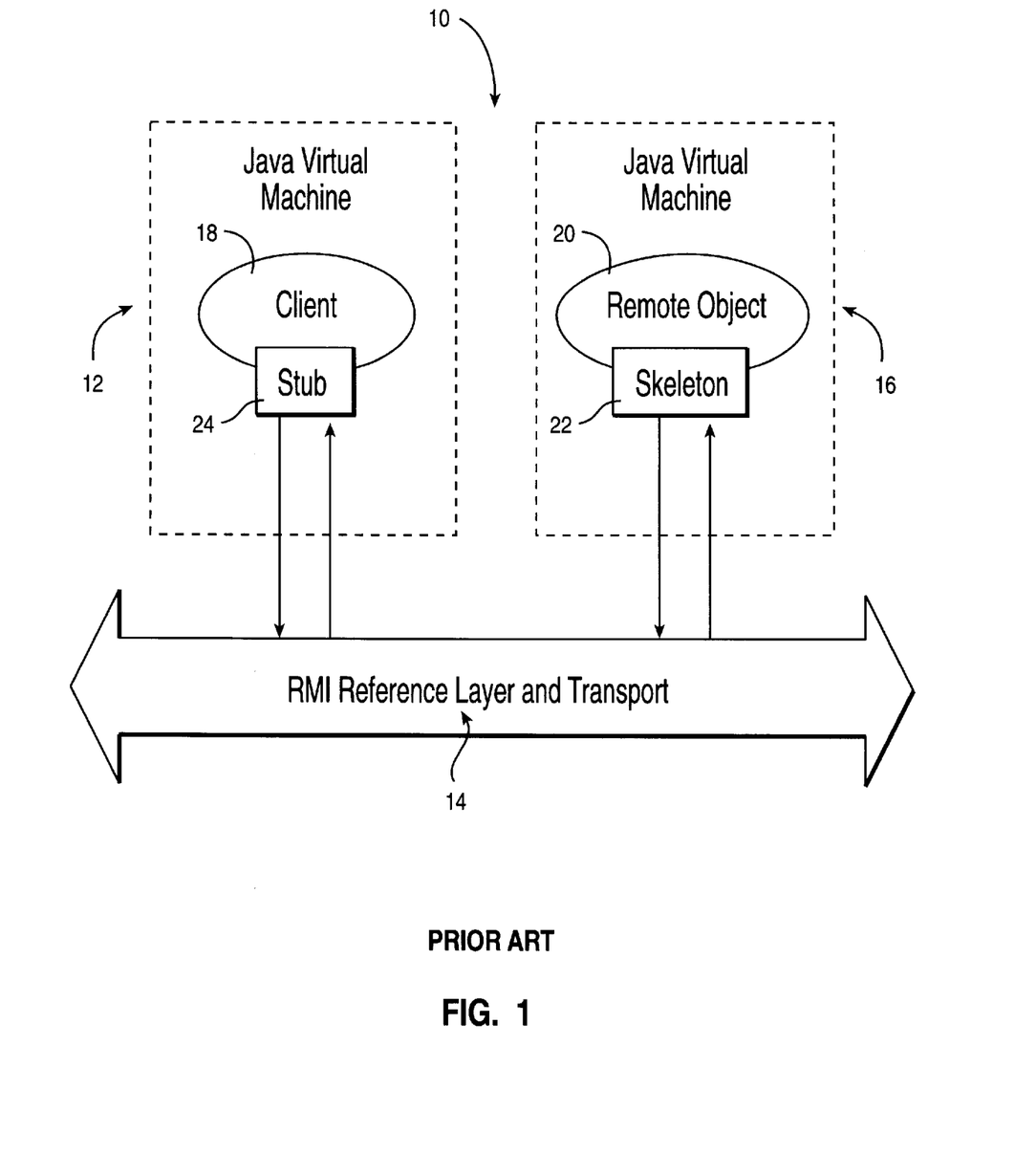
FIG. 1 illustrates a prior art Java Remote Method Invocation (RMI) communication mechanism.

Referring to FIG. 1, there is shown a block diagram of a Java Remote Method Invocation (RMI) 10 communication mechanism. The Java RMI 10 is an interprocess protocol which allows Java objects living in different Java Virtual Machines to invoke transparently each other's methods. The Java RMI 10 contains a Java Virtual Machine 12 containing a Client object 18. A corresponding Java Virtual Machine 16 contains a Remote object 20. Communications between the Virtual Machine containing the Client object 18 and Remote object 20 is possible through a RMI Reference Layer and Transport 14. Since the Virtual Machines can be running on different computers anywhere on a network, RMI enables object-oriented distributed computing. Consequently, the Java RMI 10 provides Java programmers with an efficient, transparent communication mechanism that frees them of all the application-level protocols necessary to encode and decode messages for data exchange. In order to allow the Remote object 20 to communicate with the Client object 18, Java RMI requires all server objects publish their interfaces to make them available to RMI clients. In addition, Stub classes 24 are required for dealing with bindings to the Remote Object 20 and do the Client-side marshaling. Finally, skeleton classes 22 are required on the server-side to handle incoming calls.

The Java RMI mechanism is basically the same as that used in a Remote Procedure Call (RPC) mechanism. One skilled in the art will appreciate that the Java RMI implementation requires invoking application be aware of the fact that the object resides on a server machine. Extra classes must be created on the client side to implement the RMI objects (e.g., Skeletons generated by the Java RMIC command). Likewise, on the server side, any RMI objects must be registered with the RMI server. Users desiring to run locally are required to have the RMI server, along with an application server installed and running on the client. While RMI was designed to allow developers to spread their applications over the network, it does not take into account running on a stand-alone system. This invention removes the complexities of the Java RMI implementation by eliminating the need for a Java RMI server to register remote objects. In addition, no implementation classes are required to be created with the Java RMIC command. More importantly, this invention provides the user with the ability to toggle between network and local access without having to install the application server and RMI server on the local machine. Total reuse of the objects are possible using this invention because objects are neither local or remote. The only code that is not shared between the client and server is the thin server class that controls the flow of data between the local and remote object.

Figure 2:
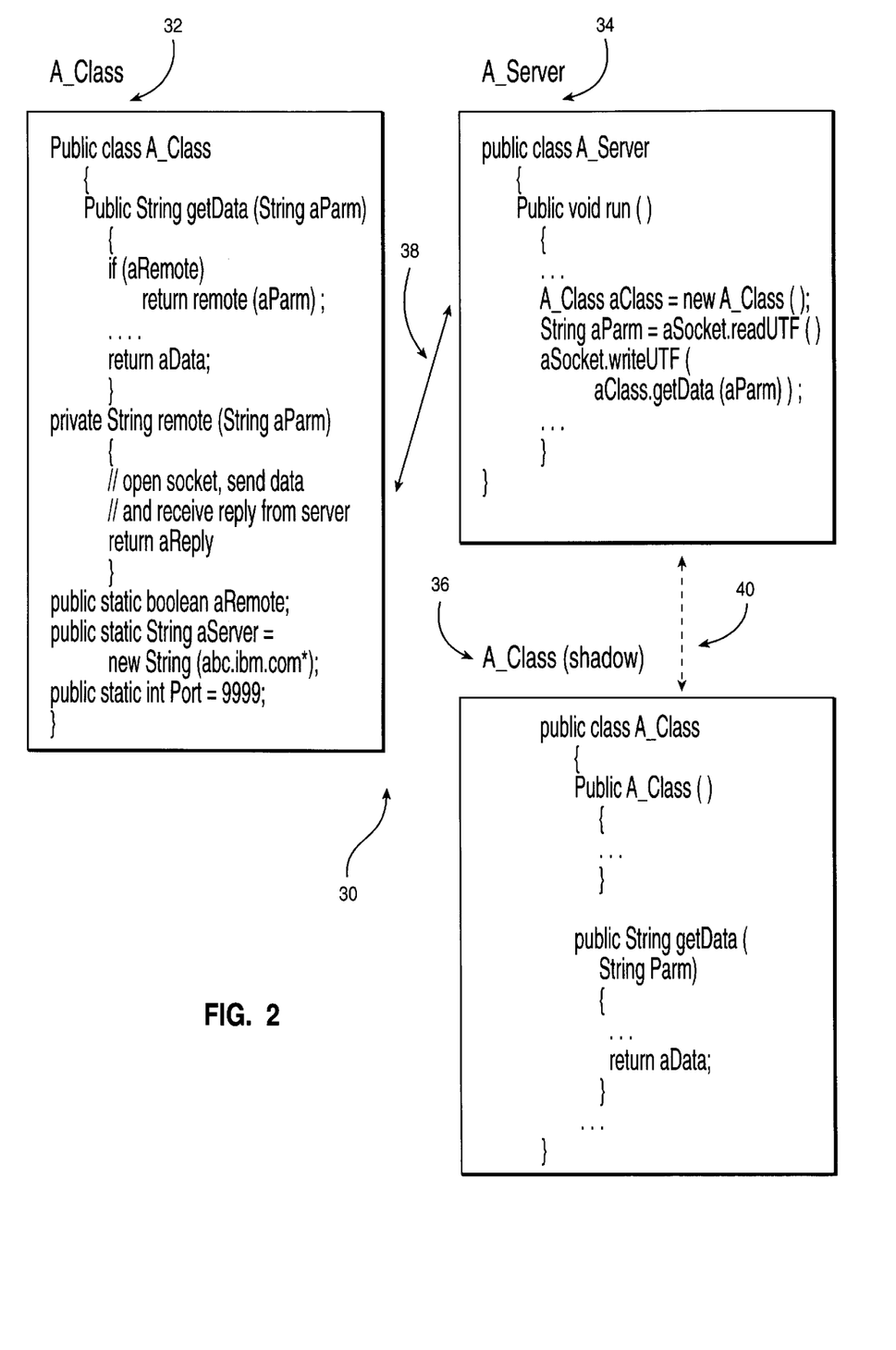
FIG. 2 is the main components of the collapsible server object as disclosed by this invention.

Referring to FIG. 2, there is shown the main components of the collapsible server object 30. The A_Class 32 is the exact same on both the client and server. The A_Class 32 has a TCP/IP communication link 38 to the A_Server 34. An A_Class 36 shadow is created on the client using normal local object method invocation 40.

A class utilizing the collapsible server object 30 architecture must contain static data members to keep track of the server's address (a String), port number on which the server is listening (an int), and whether to access local or remote data (a boolean flag). In addition, private method(s) are required that will contact the server for remote request instead of locally accessing the data. A check of the remote flag is added to strategic functions (e.g., ones that will act as the layer of abstraction between the object interface and the local/remote methods) to determine whether calling the remote or local version of the method is desired. Finally, a lightweight server is needed on the other end of the socket that will do the following:

1. Retrieve all the data sent from the client's private method. Generally, the object should send primitive data items because they are simpler to transmit and receive then whole objects;
2. Create a shadow object of the same type as the client using the data passed;
3. Invoke the desired method(s) on the server machine's shadow object; and
4. transmit the results from the shadow object area back to the client.

Figure 3:
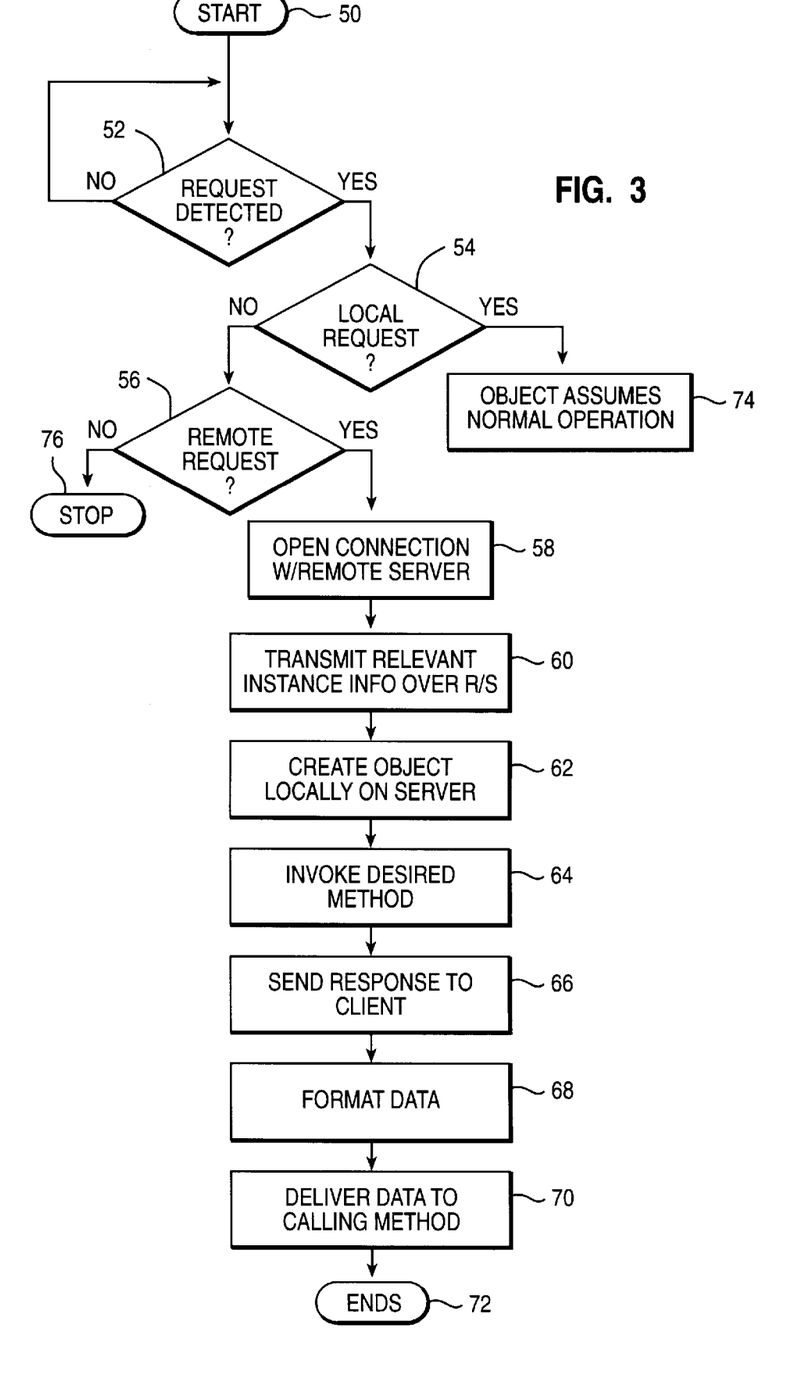
FIG. 3 is a flow diagram of the steps required for operation of the collapsible server object for connecting to a remote server.

Referring to FIG. 3, there is shown a flow diagram for operation of the collapsible server object when it handles local and remote requests for objects. The procedure starts at block 50 and moves immediately to block 52 where a check is carried out to determine if a request has been detected. If NO, the procedure continues to loop awaiting requests. If a request has been detected at block 52, the procedure determines if it is a local request at block 54. If the request is for a local object, at block 74 the procedures assumes normal client operations for the local object. If the request is not for a local request, the procedure determines at block 56 if the request is for a remote object. If a remote object request is detected, at block 58 the procedure opens a connection with the remote server. At block 60, the object transmits relevant instance information the remote server. The procedure then causes the creation of a target object locally on the server at block 62. At block 64 the object invokes the desired method and sends the response to the client at block 66. The data is formatted on the client at block 68, delivered to the calling method at block 70 and ends at block 72.

Figure 4:
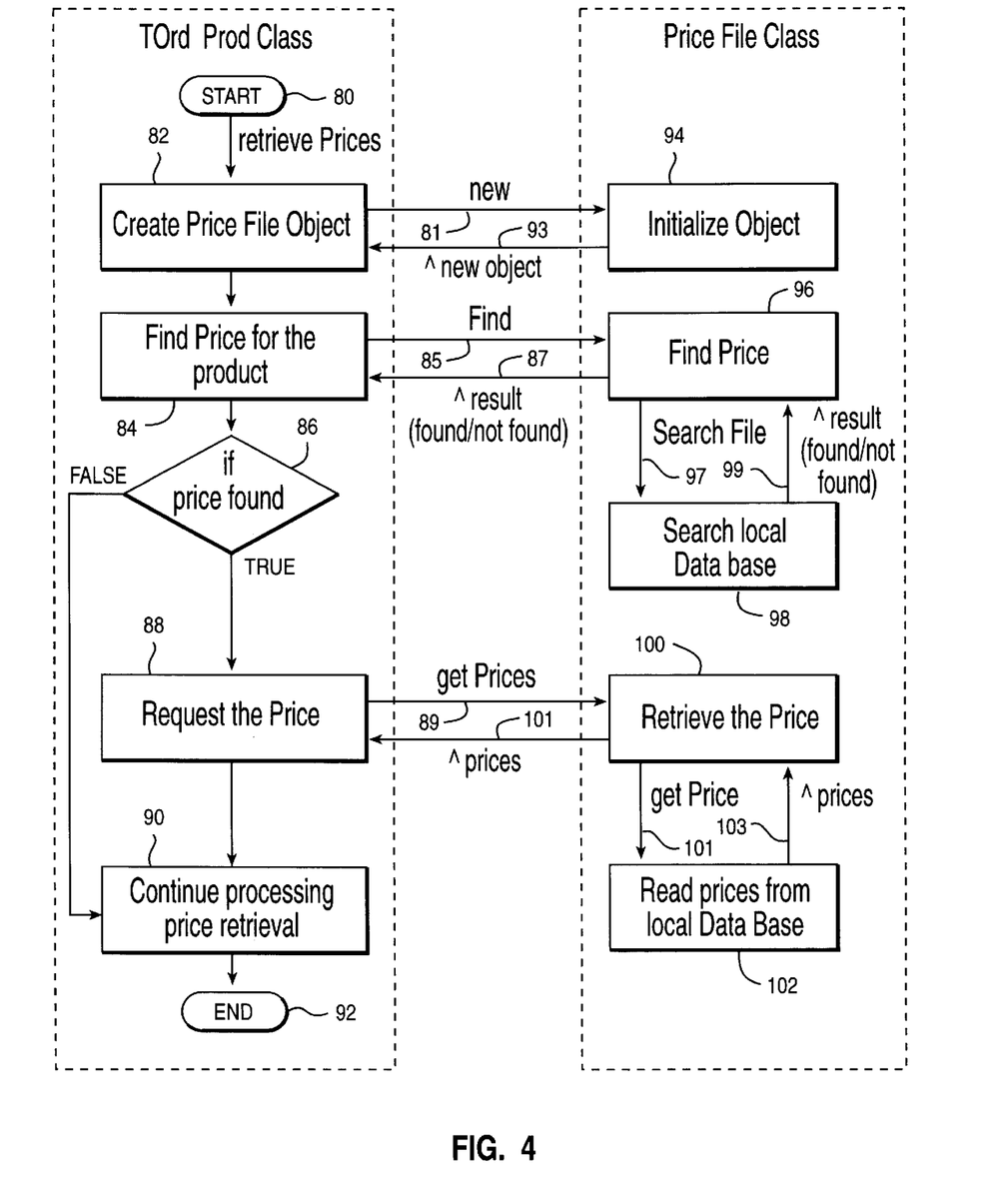
FIG. 4 is a flow diagram showing a Price File object in a Java implementation.

Referring to FIG. 4, a flow diagram is shown for an implementation of a price file using a Java implementation. The price file changes often, usually daily, to reflect price changes or new products. The price file allows users to give accurate price quotes to potential customers for products (e.g., computer systems including hardware and software). With particular reference on FIG. 4, the procedure starts at block 80 and proceeds immediately to block 82 where the price file object is created. If the object is a new object, a new request 81 is sent to initialize the object at block 94 and a reply new object 93 is returned to block 82. At block 84, the procedure attempts to find the price for the product by sending a Find request 85 to the Find Price routine at block 96. A local database is searched at block 98 in response to a Search File request 97. The result (found/not found) 99 is returned to the Find Price routine at block 96 which delivers the result (found/not found) 87. At block 86, the procedure checks to see if a price was found. If YES, at block 90 the procedure continues processing price retrieval. Else, at block 88 a getPrice request 89 is sent to a Retrieve Price routine at block 100. The Retrieve Price routine 100 generates a getPrice 101 request to read the prices from the local DataBase at block 102. A Prices 103 reply is returned to the Retrieve Price routine 100 which delivers the Prices 101 to the requester at block 88. Processing then continues at block 90 with the retrieved price and the procedure ends at block 92.

Figure 5:
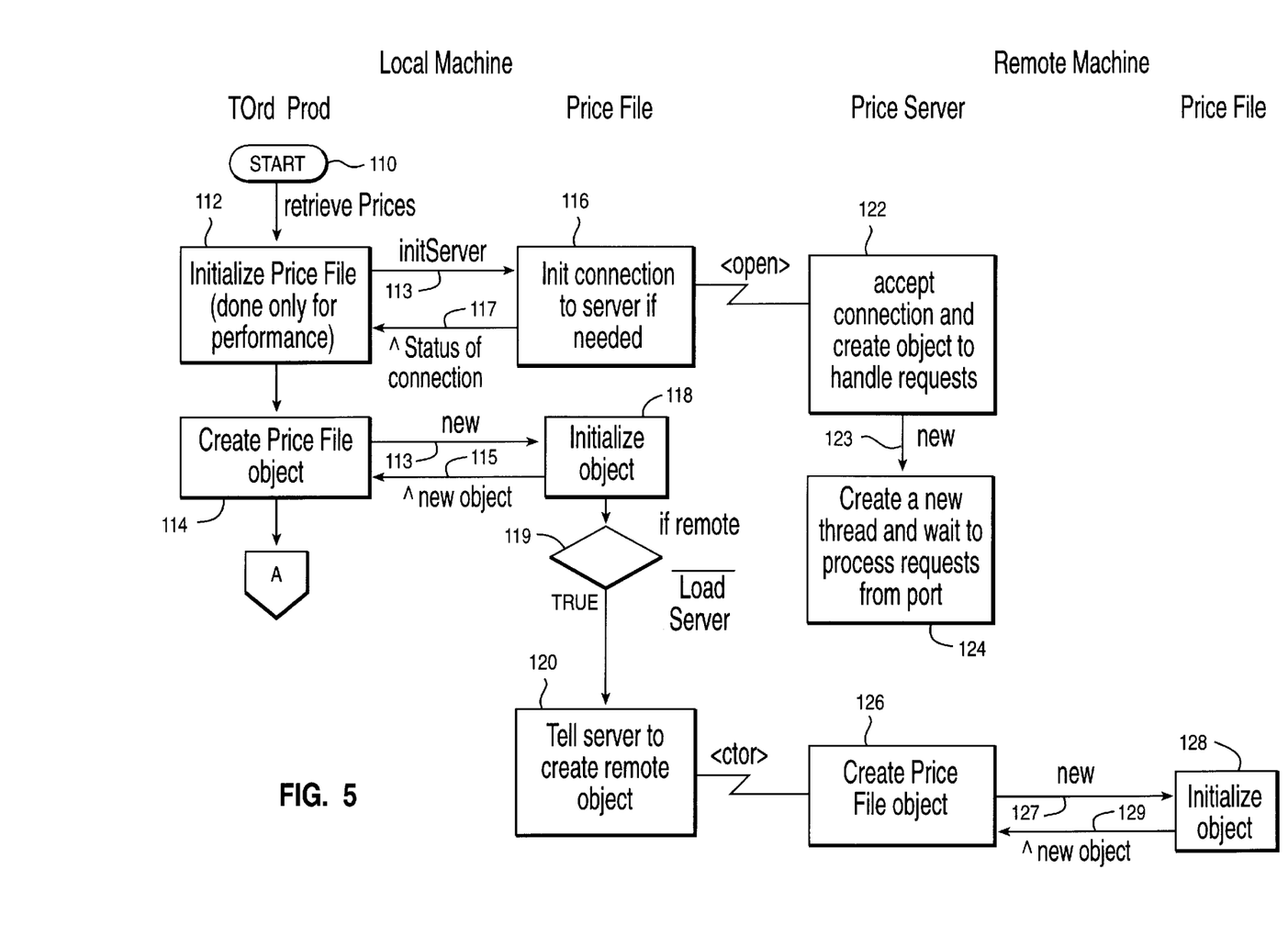
FIGS. 5–7 are flow diagrams of the collapsible server object applied to a price file object.
Figure 6:
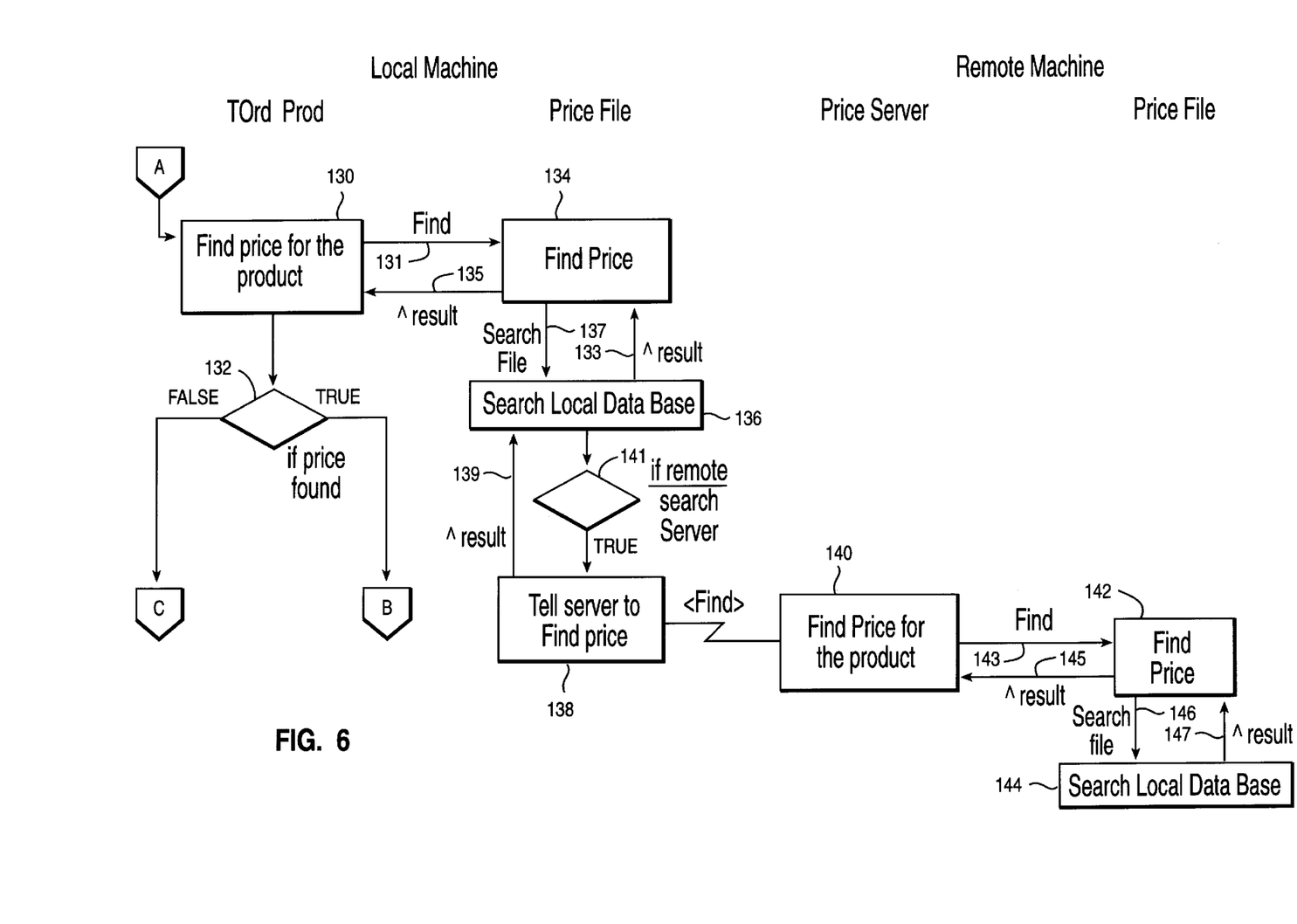
Figure 7:
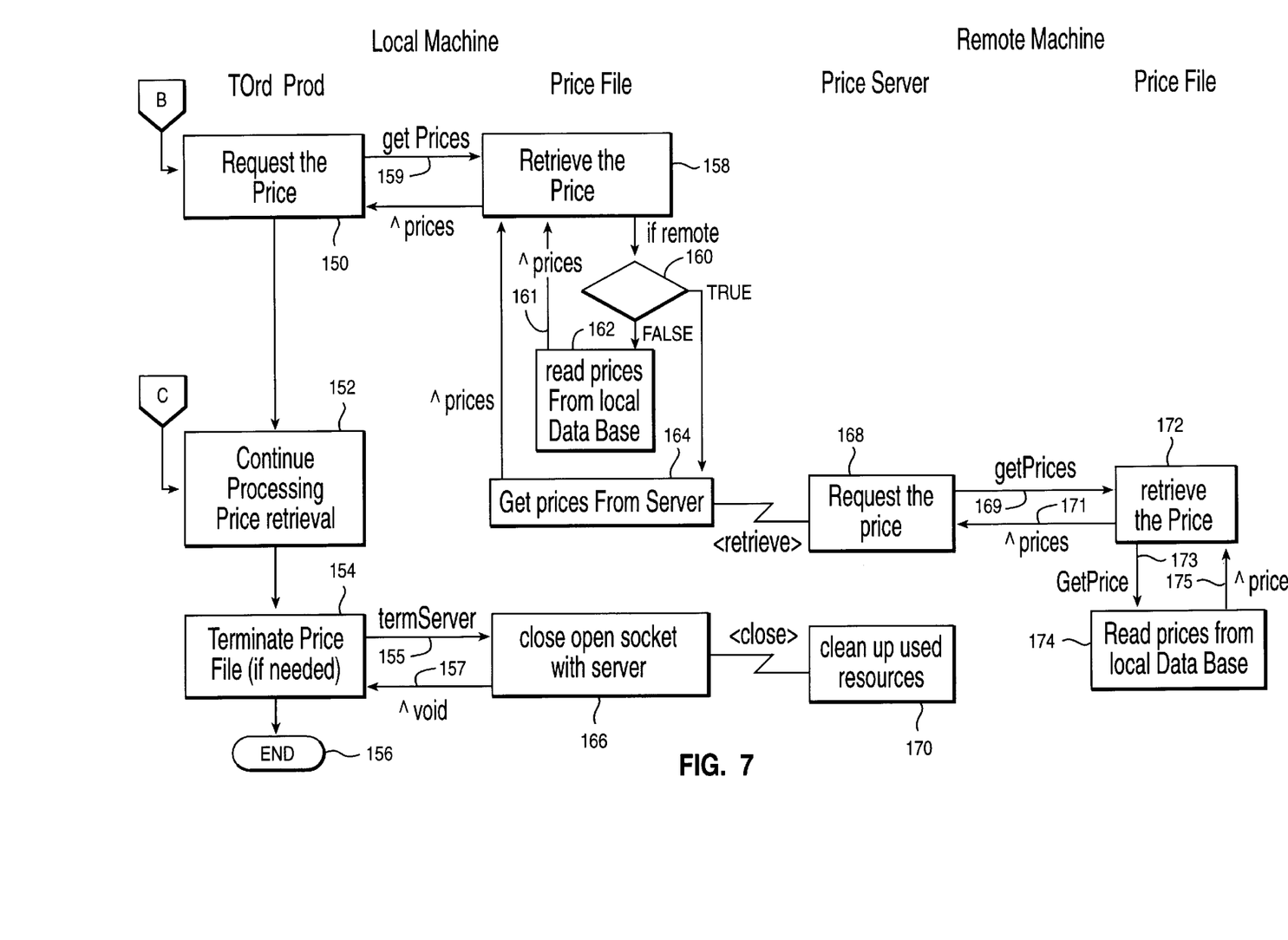

Referring to FIGS. 5–7, flow diagrams are shown for turning the above price file in a Java implementation into a client/server object using the collapsible server object architecture of this invention. In order to reduce server workload and provide ease of use/setup by a user, this approach builds a layer of abstraction into the object which mask out how the data is accessed for the requesting object. With particular reference on FIG. 5, the procedure starts at block 110 and proceeds to block 112 to Initialize Price File. An initServer request 113 is sent to initialize the connection to the server (if needed) at block 116. At block 122 the procedure accepts the connection and creates the object to handle requests. A new thread is created at block 124 which waits to process requests from a port. Returning to block 116, status of the connection 117 is returned to the Initialize Price File 112 requester. At block 114, Create Price object sends a new request 113 to Initialize the object at block 118. A check is conducted at block 119 to determine if the target object is a remote object. If yes, at block 120 the server is told to create a remote object. At block 126, the create PriceFile object on the remote machine sends a new request 127 to initialize object at block 128 which returns a new object 129 reply. Returning to block 118, the initialize object 118 returns a new object 115 reply to the requestor at block 114. Processing continues by finding the price for the product at block 130 (FIG. 6).

Referring to FIG. 6, the procedure attempts to Find a Price For the Product at block 130 and generates a Find request 131 to the Find Price routine 134. A search file request 137 is sent to search a local DataBase at block 136. A check is conducted at block 141 to determine if the required DataBase is on a remote machine. If YES, at block 138 the server is told to find the price. At block 140, the Find Price For the Product generates a Find request 143 on the remote machine. The Find Price routine 142 generates a search file 146 request to search the local Data Base at block 144. A result reply 147 is returned to the Find Price routine 142 which delivers the result reply 145. At block 138, the result reply 139 is sent to the Search Local Data Base at 136, the Find Price routine 134, and to the requestor at block 130. A check is done at block 132 to determine if the price was found. If the price is found, processing continues at block 152 (FIG. 7).

Referring to FIG. 7, at block 152 the procedure continues processing price retrieval. The procedure terminates the Price File (if needed) at block 154, and sends a terminate server request 155 to close the open socket with the server at block 166. At block 170, the procedure cleans up the used resources. At block 166, a void reply 157 is returned to the terminate Price File requestor at block 154 and the procedure ends at block 156. If the price cannot be found at block 132, processing continues at block 150 where a requester initiates a getPrices request 159 to a Retrieve Price routine at block 158. At block 160 a check is made to determine if the Data Base is on a remote machine. If NO, at block 162 the prices are read from the local Data Base. If YES, at block 164 the prices must be accessed using the server. At block 168 a getprices request 169 is sent to retrieve the price at block 172. A getprices request 173 causes the prices to be read from a local Data Base on the remote machine. The Prices reply 175 is returned for the prices to the requester at block 150. The procedure continues processing at block 152 as previously described.

Figure 8:
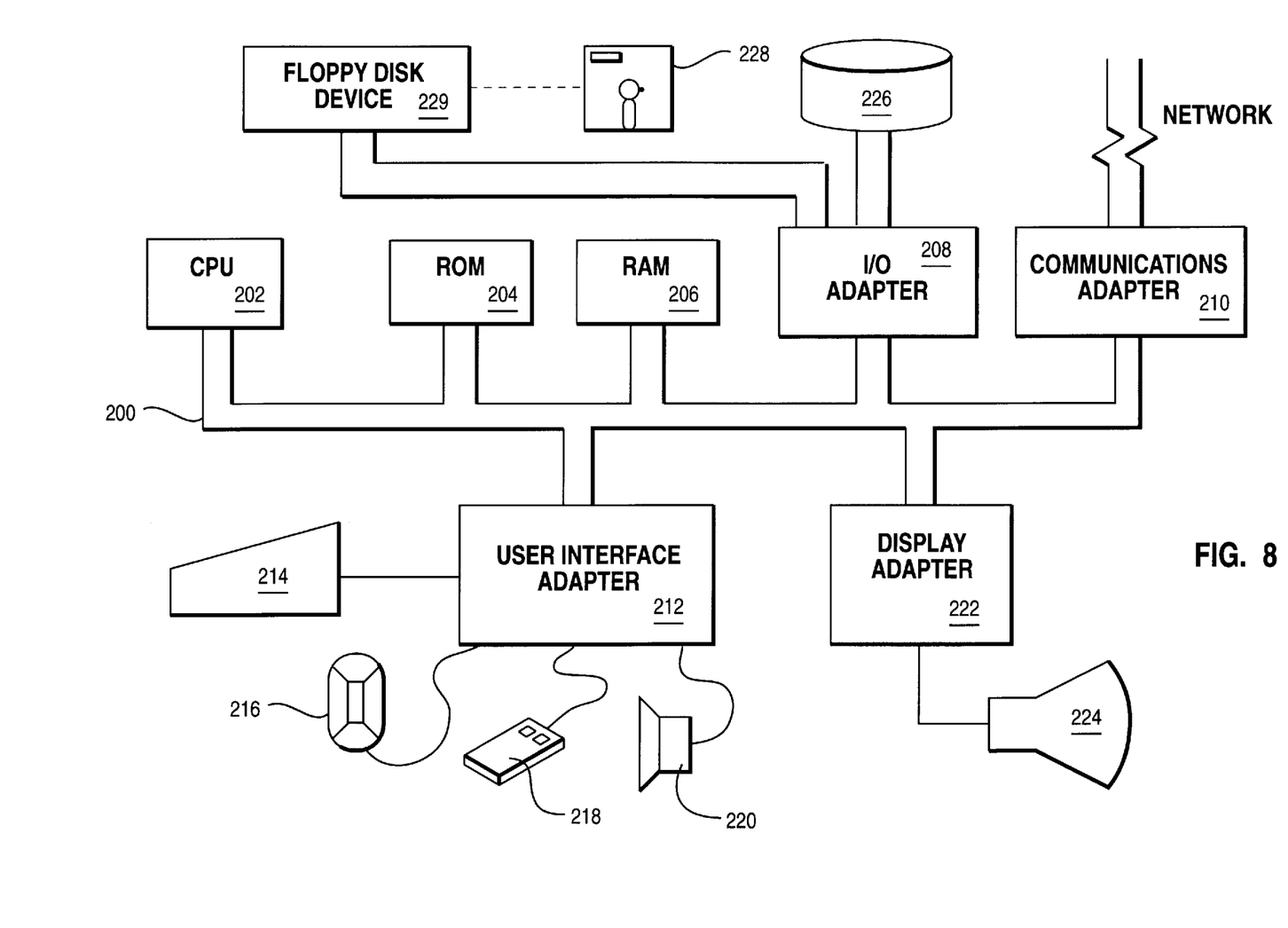
FIG. 8 illustrates a computer/workstation where this invention may be practiced.

Referring now to FIG. 8, there is shown a pictorial representation of a workstation, having a central processing unit 202, such as a conventional microprocessor, and a number of other units interconnected via a system bus 200. The workstation shown in FIG. 8, includes a Random Access Memory (RAM) 206, Read Only Memory (ROM) 204, an I/O Adapter 208 for connecting peripheral devices such as floppy disk unit 229 to the bus, a user interface adapter 212 for connecting a keyboard 214, a mouse 218, a speaker 220, a microphone 216, and/or other user interface devices such as a touch screen device (not shown) to the bus, a communication adapter 210, for connecting the workstation to a data processing network and a display adapter 222, for connecting the bus to a display device 224. The workstation, in the preferred embodiment, has resident thereon the computer software making up this invention, which may be loaded from diskette 228.

Figure 9:
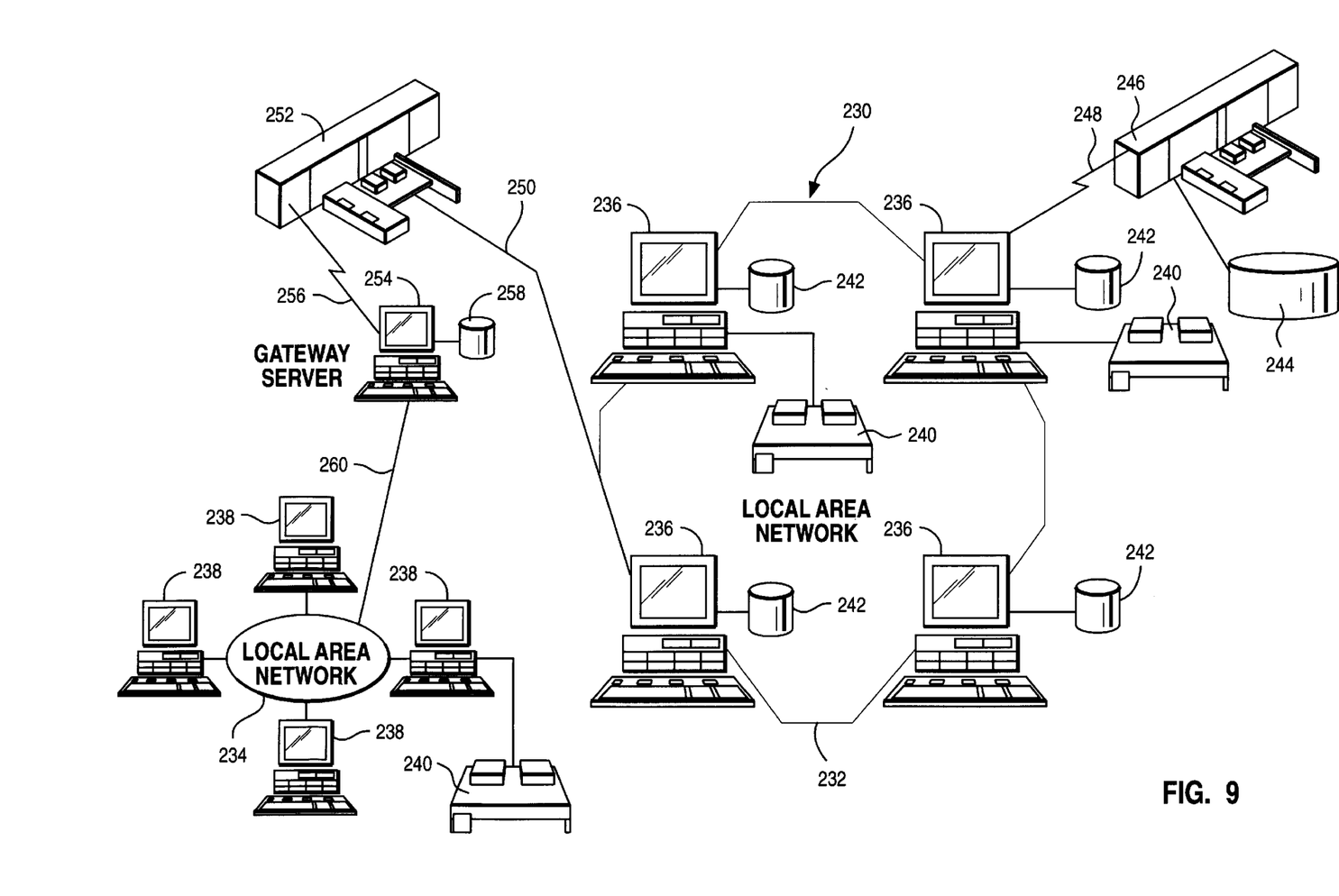
FIG. 9 is an illustrative embodiment of a computer network where the present invention may be practiced.

A representative network environment where this invention may be practiced is depicted in FIG. 9, which illustrates a pictorial representation of a distributed data processing system 230. As illustrated, data processing system 230 contains a plurality of networks, including local area networks (LAN) 232 and 234, each of which preferably includes a plurality of individual computers 236 and 238, respectively as shown in FIG. 8. One skilled in the art will appreciate that a plurality of workstations coupled to a host processor may be utilized for each such network. As is common in such data processing systems, each computer 236 and 238, may be coupled to a storage device 242, and a printer 240.

Data processing system 230 further includes one or more mainframe computers, such as mainframe computer 246, which may be preferably coupled to LAN 232 by means of a communication link 248. Mainframe computer 246 is preferably coupled to a storage device 244, which serves as remote storage for LAN 232. LAN 232 is also coupled via communications link 250 through communications controller 252 and communications link 256 to gateway server 254. Gateway server 254 is preferably a workstation which serves to link LAN 232 to LAN 234 via communications link 260. As understood by one skilled in the art, data processing system 230 additionally includes unillustrated gateways, routers, bridges, and various other network hardware utilized to interconnect the segments of data processing system 230.

While the invention has been described with respect to a preferred embodiment thereof, it will be understood by those skilled in the art that various changes in detail may be made therein without departing from the spirit, scope, and teaching of the invention. Accordingly, the herein disclosed invention is to be limited only as specified in the following claims.

What we claim is:

1. A method, implemented in a computer system, for creating an object-oriented object for retrieving information from a local and remote source, comprising the steps of:

creating said object in said computer system at a client having an interface instanced with primitives;

sending messages by an application to said object at said client in said computer system using said primitives, said application having a class utilizing said object to retrieve said information;

identifying a first request by said object at said client for said information on said local source on said computer at said client and continuing a normal sequence of operations at said client for said information in said computer system for standalone operation; and identifying a second request by said object at said client for said information on said remote source on said computer on a server and initiating communications with said server on said remote source to satisfy said second request.

2. The method of claim 1 wherein said step of identifying a second request by said object for said remote source further comprises:

detecting a remote flag by said object at said client and opening a connection with said remote source at said server using a private method of said object in said computer.

3. The method of claim 2 wherein said step of opening a connection further comprises:

transmitting instance information by said client to said remote source from said object.

4. The method of claim 2 wherein said step of opening a connection further comprises:

creating a target object on said remote source as a local object; and invoking a desired method on said target object to retrieve said information.

5. The method of claim 4 wherein said step of invoking a desired method further comprises:

transmitting the information from said target object to said object on said computer.

6. The apparatus for creating an object-oriented object for retrieving information from a local and remote source, comprising:

means for creating said object in said computer system at a client having an interface instanced with primitives;

means for sending messages by an application to said object in said computer system using said primitives, said application having a class utilizing said object to retrieve said information;

means for identifying a first request by said object at said client for said information on said local source on said computer at said client and continuing a normal sequence of operations at said client for said information in said computer system for standalone operation; and means for identifying a second request by said object at said client for said information on said remote source on said computer on a server and initiating communications with said server on said remote source to satisfy said second request.

7. The apparatus of claim 6 wherein said means for identifying a second request by said object for said remote source further comprises:

means for detecting a remote flag by said object at said client and opening a connection with said remote source at said server using a private method of said object in said computer.

8. The apparatus of claim 6 wherein said means for opening a connection further comprises:

means for transmitting instance information by said client to said remote source from said object.

9. The apparatus of claim 6 wherein said means for opening a connection further comprises:

means for creating a target object on said remote source as a local object; and means for invoking a desired method on said target object to retrieve said information.

10. The apparatus of claim 9 wherein said means for invoking a desired method further comprises:

means for transmitting the information from said target object to said object on said computer.

11. A computer program product having a computer readable medium having computer program logic recorded thereon for creating an object-oriented object for retrieving information from a local and remote source, comprising:

computer readable means for creating said object in said computer system at a client having an interface instanced with primitives;

computer readable means for sending messages by an application to said object at said client in said computer system using said primitives, said application having a class utilizing said object to retrieve said information;

computer readable means for identifying a first request by said object at said client for said information on said local source on said computer at said client and continuing a normal sequence of operations at said client for said information in said computer system for standalone operation; and computer readable means for identifying a second request by said object at said client for said information on said remote source on said computer on a server and initiating communications with said server on said remote source to satisfy said second request.

12. A computer program product of claim 11 wherein said computer readable means for identifying a second request by said object for said remote source further comprises:

computer readable means for detecting a remote flag by said object at said client and opening a connection with said remote source at said server using a private method of said object in said computer.

13. A computer program product of claim 11 wherein said computer readable means for opening a connection further comprises:

computer readable means for transmitting instance information by said client to said remote source from said object.

14. A computer program product of claim 11 wherein said computer readable means for opening a connection further comprises:

computer readable means for creating a target object on said remote source as a local object; and computer readable means for invoking a desired method on said target object to retrieve said information.

15. A computer program product of claim 14 wherein said computer readable means for invoking a desired method further comprises:

computer readable means for transmitting the information from said target object to said object on said computer.

\* \* \* \* \*